Nov. 12, 1935. J. BLACKBURN 2,020,989
UNITARY WIRE CONNECTER
Filed July 17, 1935

INVENTOR
JASPER BLACKBURN
BY Adam E. Fisher
ATTORNEY

Patented Nov. 12, 1935

2,020,989

UNITED STATES PATENT OFFICE 2,020,989

UNITARY WIRE CONNECTER

Jasper Blackburn, Webster Groves, Mo.

Application July 17, 1935, Serial No. 31,796

5 Claims. (Cl. 173—263)

This invention relates to improvements in unitary wire connecters for joining two or more electrical conductors or wires, such as a service line to a main line or the like. Unitary wire connecters of the split or bifurcated bolt type, comprising a head with a pair of parallel and segmentally threaded legs extended therefrom in spaced relation for providing a wire receiving space or slot therein between and having a tapped nut operatively anchored to the bolt and threadable upon the legs thereof, for locking the wires in place, are now quite common. So far as known the means generally employed for anchoring the nut to the bolt consists of an element of some sort longitudinally extended at the extremity of one of the legs of the bolt and disposed either directly thru the orifice of the nut or connected to or adapted to impinge a washer or bearing element which is in turn rotatably connected to the nut, so that the nut may be withdrawn off the end of the bolt and supported on this element and swung aside for admitting wires into the wire slot of the bolt. Such extensions from one leg of the bolt, while efficient for anchoring the elements together, are more or less in the way and liable to be broken off, and they also interfere with the process of taping the resulting joints.

It is the prime purpose of the present invention therefore to provide a unitary connecter of the bifurcated or slotted bolt type, including a nut operatively yoked or connected to one of the legs of the bolt and threadable thereupon, the nut being withdrawable at the end of the leg to which it is secured for admitting wires into the slot of the bolt, and wherein the means employed for thus operatively anchoring the nut to the bolt, includes no element extending or projecting beyond the transversely aligned extremities of the legs of the bolt. Another object is to provide in a connecter of the kind referred to and including a bifurcated and exteriorly threaded bolt or keeper, the legs thereof being spaced apart to form a wire receiving slot and including a nut threadable upon the legs of the bolt, means for operatively anchoring the nut to the bolt, the said means comprising an eye formed thru the extremity of one of the legs, a lug rotatably mounted within the orifice of the nut and formed to freely slide within the slot of the bolt, there being a groove or channel formed medially upon one face of the lug parallel with the axis of the orifice of the nut, and an open loop of strip metal or other suitably stiff material, the bight of the loop being turned inwardly and disposed at the predetermined inner side of the nut and one prong of the loop being anchored within the said medial channel of the lug, the extremity of the other prong being turned and sprung outwardly so as to automatically engage and pass thru the said eye of the extremity of the one leg of the bolt on the withdrawal movement of the nut, and upon which loop the nut and lug assembly may be then swung aside for admitting wires into the slot of the bolt.

With the foregoing and such other objects and advantages in view as may be described in the following specification, attention is now directed to the accompanying drawing constituting part of the specification, the same illustrating certain preferred structural features of the invention and wherein.

Figure 1:
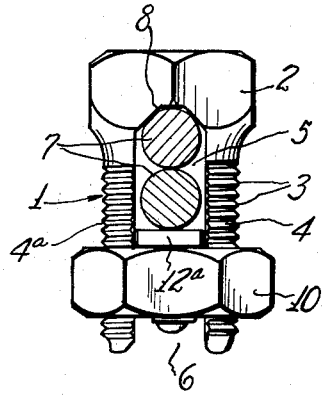
Figure 1 is a side elevation of a bifurcated form of connecter wherein the nut is operatively anchored to the keeper in accordance with my invention, two connected wires being shown in cross section.

This invention provides an improvement upon the unitary form of connecter embodying a bifurcated or slotted bolt I having the faced head 2, the bolt proper being exteriorly threaded as shown at 3 and being longitudinally slotted to provide the spaced and segmentally screw-threaded sides or legs 4—4a and the intervening wire-way or wire-slot 5 which opens out thru one end of the bolt or keeper as shown at 6, the member being thus adapted for receiving wires 7 which are to be connected. For this purpose the wires are forced up to the closed end or wire seat 8 by the nut 10, various means and methods having heretofore been employed for operatively anchoring the nut to the bolt so as to complete the unitary connecter. It will be noted that in the present embodiment, the extremities of the two legs of the bolt are substantially in transverse alignment, the legs being substantially equal in length.

Figure 2:
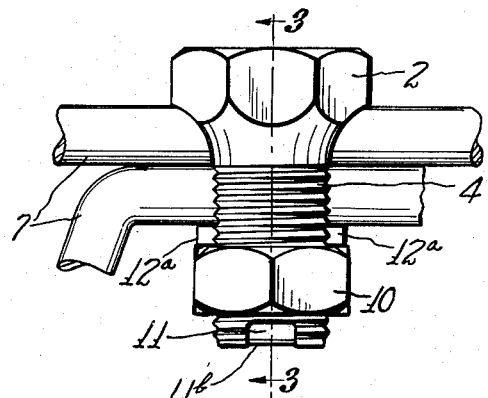
Figure 2 is a view of the assembly of Figure 1 at an angle of ninety degrees, fragments of the said wires being shown as connected.
Figure 3:
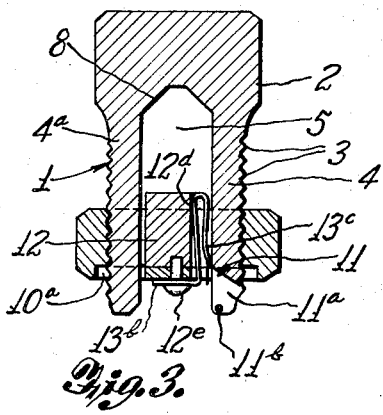
Figure 3 is a section on the line 3—3 of Figure 2, the wires however being omitted.

In carrying out the present improvement an eye 11 is formed thru the extremity of one of the legs, as the leg 4. As here shown this eye is formed by cutting a slot 11a longitudinally into the extremity of the leg, and then extending a strand of wire 11b transversely across the outer tips or margins of this slot and anchoring the ends of the strand to the said margins, as clearly shown in Figures 2 and 3. However this eye might be formed in any other convenient or conventional manner.

Figure 4:
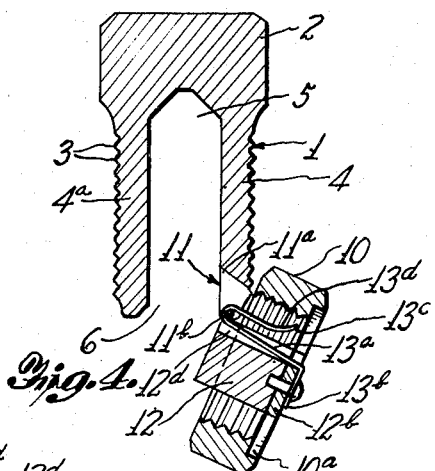
Figure 4 is a longitudinal sectional view of the assembly shown in Figure 3, the nut and lug assembly however being shown as withdrawn and swung aside at the end of the keeper or bolt, as for the admission of wires into the slot of the bolt or for their removal therefrom.
Figure 5:
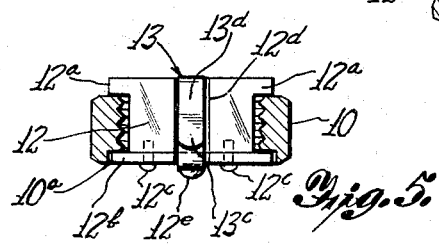
Figure 5 is a detail view, partly in section, of the nut and lug assembly, showing also the supporting loop mounted on the lug.

The nut 10 is tapped to thread upon the legs of the bolt and is formed with an annular race 10a at its predetermined outer face. A bearing lug 12 is rotatably mounted within the orifice of the nut by forming the lug to seat nicely yet freely therein, and by extending at its predetermined inner end or side the integrally connected ears 12a which overlap the predetermined inner face of the nut. A lock plate 12b is then secured to the opposite or outer end of the lug, the ends of the plate riding freely within the race 10a of the nut, as clearly shown in Figure 5. This plate may be conveniently mounted in place by means of pins 12c passed thru the plate and into the lug. This lug is dimensioned to extend somewhat above the predetermined inner face of the nut, as shown in the various figures of the drawing, for the purpose of affording a clearance to the nut and permitting same to be swung fully aside at the end of the leg to which the assembly is attached, for the admission of wires into the medial slot of the bolt, or for removing such wires, as is well illustrated in Figure 4.

The lug 12 is formed at one side with a channel or groove 12d extending thru from end to end parallel with the axis of the orifice of the nut when the lug is mounted therein. An open loop 13 of spring strip metal or other suitable material for the purpose is mounted upon the grooved side of the lug 12, for which purpose the bight of the loop is turned inwardly towards the head of the bolt, and one prong 13a of the loop is disposed within the groove 12d of the lug and the extended end 13b of this prong is turned out perpendicularly over the outer face of the plate 12b and there fastened by means of a pin 12e passed thru the end 13b and into the lug. The extremity 13c of the other prong 13d is flared outwardly, and this prong as a whole is spring set to normally press outwardly against the inner face of the leg 4 in the operation of the device, and so that as the nut 10 is unturned from the bolt 1 the free prong 13d will travel along the said inner face of the leg 4 against which it will at the time be spring pressed owing to its structure as stated, and the flared extremity 13c of the prong will automatically press outward laterally thru the eye 11 of the leg 4, after which as the nut 10 is completely unturned from the bolt, the bight of the loop 13 will impinge the strand 11b of the eye 11 and the nut and lug assembly may be swung laterally out from the end of the bolt for the admission of wires into the slot 5, or for their removal therefrom.

It will be noted that in the construction shown there is no element of any kind protruding beyond or below the aligned extremities of the bolt legs or of the predetermined outer face of the nut. Thus an electrical joint of two wires wherein this form of connecter is used may be readily taped, without interference of protruding elements. This connecter is of course to be made of any suitable material for its intended purpose, such as brass.

It is thought that from the foregoing description, the construction as well as the use and operation of the invention and of the connecter embodying same will be fully understood. When it is desired to insert wires within the slot 5 of the bolt or keeper, the nut and lug assembly is withdrawn off the end of the bolt and swung aside in the manner already explained, being held there suspended by the loop 13 interlocked with the eye 11. In order to join two or more wires they are then passed thru the entrance 6 into the slot 5 and the nut and lug assembly is turned up against them, forcing them into the seat 8 at the head of the bolt. To disjoin the wires the operation is of course reversed.

While I have herein pointed out and described a certain embodiment of the invention, including certain structural features, thereof, this embodiment and these features may of course be varied in minor details as may be expedient for producing a commercially practical connecter, not departing however from the spirit of the invention as defined in the appended claims.

I claim:

1. A unitary wire connecter, comprising in combination a bifurcated bolt having a wire receiving slot opening out thru one end, thereby forming co-equal legs of the bolt, there being an eye formed thru the extremity of one of the legs, a nut threadable upon the legs of the bolt over the slot, a bearing lug rotatably anchored within the orifice of the nut and formed to slide within the slot of the bolt as the nut is turned thereon, there being a groove formed upon one side of the lug parallel with the axis of the orifice of the nut, an open loop of resilient material having one prong mounted within the said groove of the lug, the other prong of the loop being directed outwardly and arranged to automatically engage the eye of the bolt leg on the withdrawal of the nut and lug assembly off the end of the bolt.

2. In a wire connecter of the bifurcate bolt type, the bolt element having a medial wire receiving slot opening out thru one end thereof, thereby forming co-equal legs of the bolt, there being an eye formed thru the extremity of one of the legs, the connecter including a nut threadable upon the bolt over the slot, a bearing lug rotatably anchored within the orifice of the nut and formed to travel within the slot of the bolt, and an open loop having two prongs, one prong being mounted upon one side of the lug with the bight of the loop turned inward towards the head of the bolt, the other prong of the loop being directed outwardly and arranged to automatically engage the eye of the bolt leg on the withdrawal of the nut and lug assembly off the end of the bolt.

3. In a wire connecter of the bifurcate bolt type, the bolt element having a medial wire receiving slot opening out thru one end thereof thereby forming co-equal legs of the bolt, there being an eye formed in the extremity of one of the legs, a nut threadable upon the bolt legs over the slot, a bearing lug rotatably anchored within the orifice of the nut and formed to travel within the slot of the bolt, and a two-pronged open loop of resilient material anchored by one prong to the bearing lug and arranged to travel therewith in the slot of the bolt, the other prong being extended parallel with the axis of the orifice of the nut and directed outwardly adjacent the bolt-leg carrying the eye and arranged to automatically engage that eye on the withdrawal movement of the nut and lug assembly off the end of the bolt, there being no element protruding outwardly beyond the extremities of the bolt-legs and the outer face of the nut.

4. A unitary wire connecter, comprising in combination a bifurcated bolt the parting thereof constituting a wire receiving slot opening out thru one end and forming two co-equal, exteriorly and segmentally threaded legs, there being an eye formed in the extremity of one of the legs, a nut threaded upon the legs of the bolt over the slot thereof, a bearing lug anchored in the orifice of the nut for rotation on the axis of the orifice and formed to travel thru the slot of the bolt as the nut is turned thereon, and an open loop anchored to the inner portion of the lug as mounted and assembled and arranged to travel therewith in the slot of the bolt, the loop including an inwardly turned bight portion and a free, outwardly directed prong arranged at its extremity to automatically engage the eye of the one leg of the bolt on the withdrawal of the nut off the end of the bolt, whereby the nut and lug assembly may be pendantly swung aside at the end of the bolt for inserting or removing wires.

5. In a wire connecter embodying a bifurcated bolt the parting thereof constituting a wire receiving slot opening out thru one end and forming two co-equal legs, there being an eye formed in the extremity of one of the legs, and a nut threadable upon the legs of the bolt over the slot,—a bearing lug rotatably anchored on the predetermined inner side of the nut and formed to slide thru the slot of the bolt as the nut rotates thereon, and a prong anchored upon the inner side of the said lug as assembled and arranged to travel therewith in the slot of the bolt, the free extremity of the prong being turned outwardly towards the said eye of the one leg of the bolt and arranged to automatically pass into and interlock with that eye on the withdrawal movement of the nut off the end of the bolt, whereby the nut and lug assembly may be turned off the bolt and pendantly swung aside for inserting or removing wires, there being no element protruding beyond the extremities of the bolt-legs and the outer face of the nut as mounted on the bolt.

JASPER BLACKBURN.